(12) United States Patent
Liu

(10) Patent No.: US 6,767,975 B1
(45) Date of Patent: Jul. 27, 2004

(54) OLEFIN POLYMERIZATION WITH PYRIDINE MOIETY-CONTAINING SINGE-SITE CATALYSTS

(75) Inventor: Jia-Chu Liu, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/618,938

(22) Filed: Jul. 14, 2003

(51) Int. Cl.[7] .................................................. C08F 4/42

(52) U.S. Cl. ...................... 526/161; 526/170; 526/172; 526/348

(58) Field of Search ................................ 526/161, 170, 526/172, 348

(56) References Cited

U.S. PATENT DOCUMENTS 5,637,660 A * 6/1997 Nagy et al. .................. 526/160
6,211,311 B1   4/2001 Wang et al. ................. 526/131
6,265,504 B1   7/2001 Liu et al. .................... 526/161

FOREIGN PATENT DOCUMENTS

JP    2001-253909    *  9/2001

* cited by examiner

Primary Examiner—Ling-Siu Choi
(74) Attorney, Agent, or Firm—Shao-Hua Guo

(57) ABSTRACT

An olefin polymerization process is disclosed. The polymerization is performed in the presence of a clay, an activator, and a transition metal complex that has at least one pyridine moiety-containing ligand. The presence of clay increases the catalyst activity. The process is suitable for making ultra-high molecular weight polyethylenes (UHMWPE). The UHMWPE produced has increased bulk density.

22 Claims, No Drawings

OLEFIN POLYMERIZATION WITH PYRIDINE MOIETY-CONTAINING SINGE-SITE CATALYSTS

FIELD OF THE INVENTION

The invention relates to olefin polymerization with pyridine moiety-containing single-site catalysts. More particularly, the invention relates to olefin polymerization with pyridine moiety-containing single-site catalyst in the presence of clay.

BACKGROUND OF THE INVENTION

Pyridine based single-site catalysts are known. See U.S. Pat. No. 5,637,660. These catalysts are particularly useful for making ultra-high molecular weight polyethylene (UHMWPE). See U.S. Pat. No. 6,265,504. Unlike the conventional UHMWPE made with the Ziegler catalysts, the single-site UHMWPE has narrow molecular weight distribution. The catalysts, however, have relatively low activity and the UHMWPE produced has relatively low bulk density.

Low catalyst activity means low efficiency and high cost of the polymer production. Similarly, low bulk density means low productivity per reactor unit. Polyethylene of low bulk density also dries slowly because it absorbs solvent and residual monomers. Further, low bulk density may result in inferior product quality.

New ethylene polymerization processes are needed. Ideally, the process would use the readily available pyridine based single-site catalysts, give high catalyst activity, and produce UHMWPE having increased bulk density.

SUMMARY OF THE INVENTION

The invention is an olefin polymerization process. The process is performed in the presence of a clay, an activator, and a transition metal complex having at least one pyridine moiety-containing ligand. I surprisingly found that the use of clay in the process significantly increases the catalyst activity.

The invention also includes a process for preparing an ultra-high molecular weight polyethylene (UHMWPE). The process comprises polymerizing ethylene in the presence of a clay, a supported transition metal complex having at least one pyridine moiety-containing ligand, and a non-alumoxane activator. The process is performed in the absence of aromatic solvent, α-olefin comonomer, and hydrogen. The process produces UHMWPE having an increased bulk density.

DETAILED DESCRIPTION OF THE INVENTION

The process of the invention comprises polymerizing an olefin in the presence of a clay, an activator, and a transition metal complex having at least one pyridine moiety-containing ligand.

Suitable olefins include $C_{2-20}$ α-olefins. Suitable olefins also include cyclic olefins and conjugated and non-conjugated dienes. Examples of suitable olefins are ethylene, propylene, 1-butene, 1-pentene, 1-hexene, 1-octene, 4-methyl-1-pentene, butadiene, isoprene, cyclopentene, cyclohexene, norbornene, 1-methylnorbornene, 5-methylnorbornene, the like, and mixtures thereof. Preferred olefins are $C_{2-10}$ α-olefins. More preferred olefins are ethylene, propylene, 1-butene, 1-pentene, 1-hexene, and 1-octene. Most preferred olefins are ethylene and mixtures of ethylene with a $C_{3-10}$ α-olefin.

Suitable clays include montmorillonite, saponite, hectorite, mica, vermiculite, bentonite, nontronite, beidellite, volkonskoite, magadite, and kenyaite, the like, and mixtures thereof. Preferably, the clays are modified, for example, with quaternary ammonium compounds. The modified clays are called organoclays. Organoclays are commercially available, for example, from Southern Clay Products, Inc., and Co-Op Chemical Co., LTD.

Preferably, the clay is heat-treated prior to the use in the polymerization. More preferably, the clay is heat-treated in the polymerization reactor prior to the use in the polymerization. The heat treatment is preferably conducted at a temperature within the range of 100° C. to 200° C.; more preferably from 125° C. to 165° C. The heat treatment removes moisture and other impurities from the clay.

Suitable activators include alumoxanes, alkyl aluminums, alkyl aluminum halides, anionic compounds of boron or aluminum, trialkylboron and triarylboron compounds. Examples include methyl alumoxane (MAO), polymeric MAO (PMAO), ethyl alumoxane, diisobutyl alumoxane, triethylaluminum, diethyl aluminum chloride, trimethylaluminum, triisobutyl aluminum, lithiumtetrakis (pentafluorophenyl) borate, lithium tetrakis(pentafluorophenyl)aluminate, dimethylanilinium tetrakis (pentafluorophenyl)borate, trityl tetrakis (pentafluorophenyl)borate, tris(pentafluorophenyl)borane, triphenylborane, tri-n-octylborane, the like, and mixtures thereof. MAO, PMAO, and tris-(pentafluorophenyl)borane are preferred.

Suitable transition metal complexes include those which have at least one pyridine moiety-containing ligand. By "pyridine moiety-containing ligand," I mean any ligand that includes a pyridine ring structure. Preferably, the complex has the general structure:

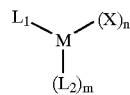

M is a transition metal. Preferably, M is Group 4 transition metal. More preferably, M is Ti or Zr. Most preferably, M is Ti.

$L_1$ is a pyridine moiety-containing ligand. Preferably, $L_1$ has the general structure:

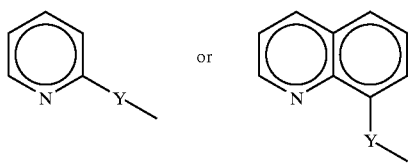

Wherein Y is bonded to M and is selected from the group consisting of O, S, and NR wherein R is hydrogen or an alkyl group. One or more of the remaining ring atoms are optionally and independently substituted by alkyl, aryl, aralkyl, alkylaryl, silyl, halogen, alkoxy, aryloxy, siloxy, nitro, dialkyl amino, or diaryl amino groups and two adjacent substituents optionally form a ring structure.

$L_2$ is a ligand selected from the group consisting of $L_1$ ligands, cyclopentadienyls, indenyls, fluorenyls, boraaryls, azaborolinyls, indenoindolyls, and phosphinimines. Preferably, $L_2$ is selected from the group consisting of $L_1$ ligands and cyclopentadienyls. More preferably, $L_2$ is an $L_1$ ligand. Most preferably, $L_2$ is the same as $L_1$.

X is a ligand selected from the group consisting of halides, alkyl, aryl, alkoxy, aryloxy, dialkylamino, and siloxy groups. Preferably, X is selected from the group consisting of halides, aralkyl, and alkylaryl groups. More preferably, X is selected from chloride and benzyl. Either m or n can be zero; the sum of n and m satisfies the valence of M.

Example of suitable complexes are bis(2-pyridinoxy) ttanium dichloride, (cyclopentadienyl)(2-pyridinoxy) titanium dichloride, 8-quinolinoxy titanium trichlorde, 8-(2-methyl-5,7-dichloroquinolinoxy)titanium trichloride, bis(8-(2-methyl-5,7-dichloroquinolinoxy))titanium dichloride, and 8-Quinolinoxytitanium tribenzyl.

Activators are generally used in an amount within the range of about 0.01 to about 100,000, preferably from about 0.1 to about 1,000, and most preferably from about 0.5 to about 50, moles per mole of the complex.

The complex is preferably supported. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titanias, zirconias, magnesium chloride, and crosslinked polystyrene. Silica is most preferred.

Preferably, the support has a surface area in the range of about 10 to about 900 m$^2$/g, a pore volume in the range of about 0.1 to about 4.0 mL/g, an average particle size in the range of about 10 to about 500 μm, and an average pore diameter in the range of about 10 to about 1000 Å. The support is preferably modified by heat treatment, chemical modification, or both. For heat treatment, the support is preferably heated at a temperature from about 50° C. to about 800° C. More preferably, the temperature is from about 100° C. to about 400° C.

Suitable chemical modifiers include organoaluminum, organosilicon, organomagnesium, and organoboron compounds. Organosilicon and organoboron compounds, such as hexamethyidisilazane (HMDS) and triethylborane, are preferred. Suitable techniques for treating a support are taught, for example, by U.S. Pat. No. 6,211,311, the teachings of which are incorporated herein by reference.

Preferably, the supporting involves treating a support with organosilicon compounds, calcining the treated support, treating the calcined support with organomagnesium compounds, mixing the organomagnesium-treated support with a pyridine moiety-containing single-site complex, and then removing any solvents from the supported catalyst. More preferably, the supporting is performed by (1) treating a silica support with HMDS, (2) calcining the HMDS-treated silica (3) treating the calcined silica with dibutylmagnesium, (4) mixing the treated silica of step 3 with a pyridine moiety-containing complex, and (5) removing any solvents. Example 1 shows a detailed procedure of supporting the catalyst.

Other suitable supporting techniques may be used. For example, the catalyst may be supported by using the method taught by co-pending Appl. Ser. No. 09781,464. First, a quinolinol is deprotonated to produce an anionic ligand precursor. Second, the anionic ligand precursor reacts with about 0.5 equivalent of a transition metal compound to give a mixture that contains quinolinoxy ligand-containing complex. Third, the mixture reacts with a non-alumoxane activator. Fourth, the product from step three is combined with a support. Finally, the solvents are removed to give a solid, supported complex.

Optionally, the activator and the complex can be mixed and then supported together. Alternatively, only the complex is supported.

The polymerization is preferably conducted at a temperature within the range of about 50° C. to 150° C., preferably about 75° C. to 135° C. The polymerization is preferably conducted under pressure. The reactor pressure is preferably within the range of about 100 to about 5,000 psi, more preferably from about 300 to about 3,000 psi, and most preferably from about 500 to about 2,000 psi. Generally, the higher the pressure, the more productive the process.

The process of the invention includes solution, slurry and gas phase polymerizations. In the solution or slurry process, aliphatic, cyclic and aromatic hydrocarbons are suitable solvents. Preferred solvents include pentane, hexane, heptane, octane, isobutane, cyclohexane, toluene, and the like, and mixtures thereof.

The invention includes a process for making an ultra-high molecular weight polyethylene (UHMWPE). The process uses a non-alumoxane activator. Suitable non-alumoxane activators for making UHMWPE include alkyl aluminums, alkyl aluminum halides, anionic compounds of boron or aluminum, trialkylboron and triarylboron compounds, and the like. Examples are triethylaluminum, trimethylaluminum, diethylaluminum chloride, lithium tetrakis(pentafluorophenyl) borate, triphenylcarbenium tetrakis(pentafluorophenyl) borate, lithium tetrakis (pentafluorophenyl) aluminate, tris(pentafluorophenyl) boron, tris(pentabromophenyl) boron, and the like, and mixtures thereof.

The polymerization for making UHMWPE is preferably conducted at a temperature within the range of about 40° C. to 110° C., preferably about 50° C. to 80° C. A high polymerization temperature results in a low molecular weight of polyethylene. If the temperature is too high, UHMWPE cannot be obtained.

The polymerization for making UHMWPE is conducted in the absence of an aromatic solvent. Saturated aliphatic and cyclic hydrocarbons are suitable solvents. Preferred solvents include pentane, hexane, heptane, octane, isobutane, cyclohexane, and the like, and mixtures thereof. Using an aromatic solvent in the process reduces the molecular weight of polyethylene. UHMWPE cannot be obtained when an aromatic solvent is used.

The polymerization for making UHMWPE is performed in the absence of hydrogen or any other chain transfer agent. Using hydrogen in the process reduces the molecular weight of the polyethylene. UHMWPE cannot be obtained in the presence of hydrogen.

The polymerization for making UHMWPE is conducted in the absence of other a-olefin comonomers such as propylene, 1-butene, or 1-hexene. Incorporation of an α-olefin comonomer reduces the molecular weight of polyethylene. UHMWPE cannot be obtained when an α-olefin comonomer is used.

I have surprisingly found that the process of the invention gives much higher catalyst activity than the known process (see Table 1). More surprisingly, the process of the invention produces UHMWPE having increased bulk density.

UHMWPE made by the process of the invention has a weight average molecular weight (Mw) greater than about 3,000,000. Preferably, Mw is greater than about 4,500,000. The UHMWPE has a bulk density greater than 0.26 g/cc. Preferably, the UHMWPE has a bulk density is 0.3 g/cc or greater.

The invention includes an UHMWPE. The UHMWPE contains a clay. Suitable clay includes those discussed above. Unlike other ethylene polymers, UHMWPE has poor thermal processability. Thus, it is difficult to incorporate clay into an UHMWPE by post polymerization process. This invention provides a way to prepare an UHMWPE that contains clay. The incorporated clay can improve the performance of the UHMWPE or function as filler.

UHMWPE has a variety of uses. In particular, it can be advantageously used to make film, pressure pipe, large-part blow molding, extruded sheet, and many other articles. It can be used alone or blended with other resins. Techniques for making these articles are well known in the polyolefin industry.

The following examples merely illustrate the invention. Those skilled in the art will recognize many variations that are within the spirit of the invention and scope of the claims.

EXAMPLE 1

Polymerizing Ethylene with Supported 8-Quinolinoxytitanium Tribenzyl in the Presence of Clay (A) Preparing 8-Quinolinoxytitanium Trichloride Under nitrogen, 8quinolinol powder (1.45 g, 10.0 mmol) and heptane (100 mL) are added to a flask and stirred. The stirring rate is adjusted to prevent solids from depositing on the walls of the flask. Titanium tetrachloride (10 mL of 1.0 M solution in heptane) is added dropwise to the flask over 20 hours at 25° C. at a stirring rate effective to prevent solids from depositing on the walls of the flask. The reaction mixture changes from white to tomato-juice red. The solids are isolated by decanting the liquid portion. Residual solvent is removed from the solids under vacuum, resulting in a red solid, which is 8-quinolinoxytitanium trichloride (3.04 g).

(B) Preparing 8-Quinolinoxytitanium Tribenzyl

8-Quinolinoxytitanium trichloride (0.060 g, 0.2 mmol, prepared in (A) is mixed with toluene (10 mL). Benzylmagnesium chloride (0.60 mL of 1.0 M solution in diethyl ether, 0.60 mmol) is added to the mixture with stirring at 25° C., resulting in a purple solution of 8-quinolinoxytitanium tribenzyl (10 mL, 0.2 mmol).

(C) Supporting 8-Quinolinoxytitanium Tribenzyl

Silica (Davison 948, 5.0 g) is pretreated with HMDS and then calcined 4 h at 600° C. The treated silica is suspended in heptane (25 mL). Dibutylmagnesium (5.0 mL of 10 wt % solution in heptane, 3.0 mmol) is added to the silica suspension under nitrogen at 25° C. 8-Quinolinoxytitanium tribenzyl (1.0 mmol) is dissolved in dichloromethane (25 mL) to give a purple solution. This solution is then added to the above mixture at 25° C. under nitrogen over 1 h. The solvent is removed by nitrogen purge, and the catalyst is dried under vacuum for 0.5 h.

(D) Polymerization

Polymerization is conducted in a 2L stainless steel pressure reactor.

Lucentite™ organophilic clay (5 g, product of Co-Op Chemical Co., LTD) is added to the reactor. The reactor is heated at 150° C. for an hour, purged with nitrogen three times, and then sealed and cooled to 25° C. The supported quinolinoxytitanium tribenzyl (0.05 g), triethylaluminum (TEAL) (0.60 mL, 1.6 M in isobutane), and hexane (1,000 mL) are charged into the reactor. After the reactor contents are heated to 60° C., ethylene, dried by passing through 13X molecular sieves, is fed into the reactor via a pressure regulator to start the polymerization. The polymerization is performed at 70° C. by continuously feeding ethylene to maintain the reactor pressure at 550 psi. The polymerization is terminated by venting the reactor. Butylated hydroxytoluene (1,000 ppm) is added to the polymer. The polymer is dried for an hour at 80° C. under vacuum. It has Mw: $5.25 \times 10^6$ g/mol. and bulk is density: 0.32 g/cc. The catalyst activity is 33,100 kg PE/mol cat/h.

EXAMPLE 2

Polymerizing Ethylene in the Presence of Clay

Example 1 is repeated, but in step (D), the clay is not heated at 150° C. for an hour. Rather, the empty reactor is heated at 130° C. for an hour, purged with nitrogen for 3 times, and then sealed and cooled to 25° C. The clay (5 g), supported quinolinoxytitanium tribenzyl (0.05 g), triethylaluminum (TEAL) (0.60 mL, 1.6 M in isobutane), and hexane (1,000 mL) are charged into the reactor. After the reactor contents are heated to 60° C., ethylene, dried by passing through 13X molecular sieves, is fed into the reactor via a pressure regulator to start the polymerization. The polymerization is performed at 70° C. by continuously feeding ethylene to maintain the reactor pressure at 550 psi. The polymerization is terminated by venting the reactor. Butylated hydroxytoluene (1,000 ppm) is added to the polymer. The polymer is dried for an hour at 80° C. under vacuum. It has Mw: $5.14 \times 10^6$ g/mol. and bulk density: 0.32 g/cc. The catalyst activity is 27,300 kg PE/mol cat/h.

EXAMPLE 3

Polymerizing Ethylene in the Presence of Clay

Example 1 is repeated, but in step (D), the clay is pre-heated at 150° C. for an hour outside of the reactor. The reactor is heated at 130° C. for an hour, purged with nitrogen three times, and then sealed and cooled to 25° C. The pre-heated clay (5 g), supported quinolinoxytitanium tribenzyl (0.05 g), triethylaluminum (TEAL) (0.60 mL, 1.6 M in isobutane), and hexane (1,000 mL) are charged into the reactor. After the reactor contents are heated to 60° C., ethylene, dried by passing through 13X molecular sieves, is fed into the reactor via a pressure regulator to start the polymerization. The polymerization is performed at 70° C. by continuously feeding ethylene to maintain the reactor pressure at 550 psi. The polymerization is terminated by venting the reactor. Butylated hydroxytoluene (1,000 ppm) is added to the polymer. The polymer is dried for an hour at 80° C. under vacuum. It has Mw: $5.08 \times 10^6$ g/mol. and bulk density: 0.31 g/cc. The catalyst activity is 16,000 kg PE/mol cat/h.

COMPARATIVE EXAMPLE 4

Polymerizing Ethylene in the Absence of Clay

Example 1 is repeated, but in step (D), no clay is added. The reactor is heated at 130° C. for an hour, purged with nitrogen three times, and then sealed and cooled to 25° C. The supported quinolinoxytitanium tribenzyl (0.05 g), triethylaluminum (TEAL) (0.60 mL, 1.6 M in isobutane), and hexane (1,000 mL) are charged into the reactor. After the reactor contents are heated to 60° C., ethylene, dried by passing through 13X molecular sieves, is fed into the reactor via a pressure regulator to start the polymerization. The polymerization is performed at 70° C. by continuously feeding ethylene to maintain the reactor pressure at 550 psi. The polymerization is terminated by venting the reactor. Butylated hydroxytoluene (1,000 ppm) is added to the polymer. The polymer is dried for an hour at 80° C. under vacuum. It has Mw: $4.04 \times 10^6$ g/mol. and bulk density: 0.26 g/cc. The catalyst activity is 9,600 kg PE/mol cat/h.

EXAMPLE 5

Polymerizing Ethylene in the Presence of Clay

Example 1 is repeated, but in step (D), isobutane rather than hexane is used as solvent and the reactor pressure remains at 300 psig rather than 550 psig. The polyethylene has Mw: $4.97 \times 10^6$ g/mol. and bulk density: 0.31 g/cc. The catalyst activity is 10,000 kg PE/mol cat/h.

EXAMPLE 6

Polymerizing Ethylene in the Presence of Clay

Example 1 is repeated, but in step (D), the clay is pre-heated at 150° C. for an hour before added to the reactor. Isobutane rather than hexane is used as solvent and the reactor pressure remains at 300 psig rather than 550 psig. The polyethylene has,Mw: $4.87 \times 10^6$, g/mol. and bulk density: 0.30 g/cc. The catalyst activity is 9,000 kg PE/mol cat/h.

COMPARATIVE EXAMPLE 7

Polymerizing Ethylene in the Absence of Clay

Example 1 is repeated, but in step (D), no clay is added to the reactor. Isobutane rather than hexane is used as solvent and the reactor pressure remains at 300 psig rather than 550 psig. The polyethylene has Mw: $3.99 \times 10^6$ g/mol. and bulk density: 0.26 g/cc. The catalyst activity is 7,800 kg PE/mol cat/h.

TABLE 1

Results Summary

| Ex. No. | Clay | Polym. Temp. °C. | Ethylene Pressure psig | Solvent | Catalyst Activity Kg PE/mol cat/h | Mw × $10^{-6}$ | Bulk Density g/cc |
|---|---|---|---|---|---|---|---|
| 1 | yes | 70 | 550 | Hexane | 33,100 | 5.25 | 0.32 |
| 2 | yes | 70 | 550 | Hexane | 27,300 | 5.14 | 0.32 |
| 3 | yes | 70 | 550 | Hexane | 16,500 | 5.08 | 0.31 |
| C4 | no | 70 | 550 | Hexane | 9,600 | 4.04 | 0.26 |
| 5 | yes | 70 | 300 | Iso-butane | 10,000 | 4.97 | 0.31 |
| 6 | yes | 70 | 300 | Iso-butane | 9,000 | 4.87 | 0.30 |
| C7 | no | 70 | 300 | Iso-butane | 7,800 | 3.99 | 0.26 |

I claim:

1. A process comprising polymerizing an olefin in the presence of a clay, an activator, and a Group 4 transition metal complex having at least one pyridine moiety-containing ligand.

2. The process of claim 1 wherein the transition metal complex has the general structure:

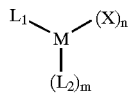

wherein M is a Group 4 transition metal; $L_1$ is a pyridine moiety-containing ligand; $L_2$ is a ligand selected from the group consisting of $L_1$ ligands, cyclopentadienyls, indenyls, fluorenyls, boraaryls, azaborolinyls, indenoindolyls, and phosphinimines; X is a ligand selected from the group consisting of alkyl, aryl, alkoxy, aryloxy, halide, dialkylamino, and siloxy groups; and the sum of n and m satisfies the valence of M.

3. The process of claim 2 wherein the M is Ti or Zr.

4. The process of claim 2 wherein $L_1$ has the general structure:

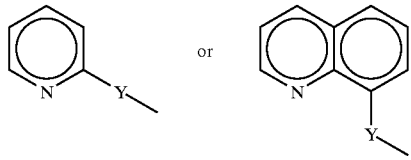

wherein Y is bonded to M and is selected from the group consisting of O, S, and NR wherein R is hydrogen or an alkyl group; one or more of the remaining ring atoms are optionally and independently substituted by alkyl, aryl, aralkyl, alkylaryl, silyl, halogen, alkoxy, aryloxy, siloxy, nitro, dialkyl amino, or diaryl amino groups and two adjacent substituents optionally form a ring structure.

5. The process of claim 1 wherein the olefin is selected from the group consisting of ethylene, propylene, 1-butene, 1-pentene, 1-hexene, 1-octene, 4-methyl-1-pentene, and mixtures thereof.

6. The process of claim 1 wherein the olefin is a mixture of ethylene and a $C_3$ to $C_{10}$ α-olefin.

7. The process of claim 1 wherein the olefin is ethylene.

8. The process of claim 1 wherein the activator is selected from the group consisting of alumoxanes, alkyl aluminums, alkyl aluminum halides, anionic compounds of boron or aluminum, trialkylboron and triarylboron compounds, and mixtures thereof.

9. The process of claim 1 wherein the activator is methylalumoxane (MAO) or polymeric MAO.

10. The process of claim 1 wherein the activator is tris-(pentafluorophenyl)borane.

11. The process of claim 1 wherein the transition metal complex is 8-quinolinoxytitanium trichloride.

12. The process of claim 1 wherein the transition metal complex is 8-quinolinoxytitanium tribenzyl.

13. The process of claim 1 wherein the clay is selected from the group consisting of montmorillonite, saponite, hectorite, mica, vermiculite, bentonite, nontronite, beidellite, volkonskoite, magadite, and kenyaite, and mixtures thereof.

14. The process of claim 1 wherein the clay is an organoclay.

15. The process of claim 1 wherein the clay is heat-treated prior to the polymerization.

16. The process of claim 1 wherein the complex is supported.

17. The process of claim 1 wherein the complex is supported on silica.

18. A process for producing an ultra-high molecular weight polyethylene (UHMWPE), said process comprising polymerizing ethylene at a temperature within the range of about 40° C. to about 110° C. in the presence of a supported Group 4 transition metal complex having at least one pyridine moiety-containing ligand, a clay, and a non-alumoxane activator, in the absence of aromatic solvent, α-olefin comonomer, or hydrogen, said UHMWPE having a weight average molecular weight (Mw) greater than about 3,000,000 and molecular weight distribution (Mw/Mn) less than about 5.0.

19. The process of claim 18 wherein the non-alumoxane activator is selected from the group consisting of trialkyl amines, alkyl aluminums, alkyl aluminum halides, anionic compounds boron or aluminum, trialkyl boron compounds, triaryl boron compounds, and mixtures thereof.

20. The process of claim 18 wherein the activator is triethyl aluminum.

21. The process of claim 18 wherein the clay is an organoclay.

22. The process of claim 18 wherein the transition metal complex is quinolinoxytitanium trichloride or 8-quinolinoxytitanium tribenzyl.

* * * * *